United States Patent Office 3,173,887
Patented Mar. 16, 1965

3,173,887
POLYURETHANE FOAMS USING ESTERIFIED DIMER ACIDS
Thomas E. Yeates and Charles M. Thierfelder, Peoria, Ill., assignors to the United States of America as represented by the Secretary of Agriculture
No Drawing. Filed Dec. 19, 1962, Ser. No. 245,939
2 Claims. (Cl. 260—2.5)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to novel polyester intermediates and to polyester polyurethane foams made therewith.

More particularly, our invention relates to novel polyester-type intermediates that are prepared by hydroxyethylating commercially available dimer-acid to critical extents and to inexpensive polyester-type flexible polyurethane foams prepared therewith.

Cost considerations in the highly competitive commercial production of urethane foams have resulted in the increased use of polyether polyols in place of the more expensive polyester polyols.

In an attempt to somewhat offset the loss of markets for polyunsaturated vegetable drying oils such as soybean and linseed oils and their constituent acids in indoor paints and in polyesterurethane foams, we have now discovered that commercially available dimer-acid obtained by dimerizing polyunsaturated vegetable oil fatty acids when esterified within certain critical molar proportions, i.e., with from 1 to 2 moles of ethylene oxide per mole of dimer acid, are suitable as low-cost reactants with conventional diisocyanates to form polyester urethane foams that cost less than conventional polyesterurethanes and that are characterized by favorably low densities on the order of 2 to 3 lbs./cu.ft.

Thus a principal object of our invention is the preparation from commercially available dimer acid products of critically esterified derivatives having adequate functionality as well as viscosities in the range of about 3600–13,000 cps. which we found on reaction with isocyanate to be essential for successful foam formation and entrapment as well as for the avoidance of shrinkage.

The dimerized polyunsaturated fatty acid starting material consisting of three parts of $C_{36}$-dibasic acid and one part $C_{54}$-tribasic acid is known (see Young et al., U.S. Patent No. 2,491,350) and is commercially available. The general method for condensing the said dimer acid material with ethylene oxide in the presence of an alkaline catalyst is also known. See Barker, U.S. Patent No. 2,758,976, who reacted dimer acid with 28 molar equivalents of ethylene oxide to obtain a viscosity-stabilizing hydraulic fluid additive. However, this prior art highly etherified dimer acid material would be completely inoperative for applicants' purpose inasmuch as we were unable to prepare stable polyurethane foams with dimer acid that was reacted with more than 2 molar equivalents of ethylene oxide, above which level of reaction some etherification takes place and the shrinkage of the foam prior to crosslinking became very extensive and could not be materially reduced even by reversing the mixing order.

Table I shows the conditions employed for several hydroxyethylations of the dimer acid and the principal characteristics of the esterified dimer acids. As would be expected, it also shows the marked effect on the viscosity of the resulting ester of increasing the temperature and the reaction time. Table II shows the properties of the esterified dimer acid starting materials used in procedural Tables III and IV in which the orders of addition and mixing differ and in Table V which shows the properties of the cured foams. The mixing order indicated in Table IV was employed in order to permit polymerization to begin ahead of the evolution of $CO_2$, and is preferred to the mixing order shown in Table III.

The following example is intended to more fully describe the invention.

EXAMPLE 1

Into a waxed paper cup were placed 16.9 g. of hydroxyethylated dimer acid (dimer acid No. 5 of Table II) containing 1.1 mole equivalents of ethylene oxide and 8 ml. of a commercially available mixture consisting of 80 percent 2,4-tolylene diisocyanate and 20 percent 2,6-tolylene diisocyanate. After stirring the mixture at 5,900 r.p.m. for a few moments, 0.05 gm. triethylenediamine catalyst dissolved in 0.25 ml. water was added and the mixture stirred as before, thus generating a foam which cured by standing overnight at 70° C. The properties of this (No. 9) and several replicate foams (Nos. 10–12) are shown in Table V.

*Table I.—Hydroxyethylation of dimer acid*

| Reaction conditions | | Product characterstics | | | | |
|---|---|---|---|---|---|---|
| Time, hr. | Temp., ° C. min.-max. | Acid value [a] | Viscosity at 25° C., poises | Hydroxyl value | Sapon. value | $n$ [b] |
| 7¾ | 100–155 | 0.5 | 36 | 110 | 183 | 1.1 |
| 5 | 141–161 | 1 | 62 | 110 | | |
| 5¾ | 135–155 | 1 | 63 | 98 | 175 | 1.8 |
| 5½ | 140–153 | 3 | 66 | 101 | | |
| 10¼ | 140–177 | 0 | 790 | 54 | 184 | 1.1 |
| 8¼ | 203–210 | 0 | 900 | 59 | 180 | [c] 1.4 |
| 10½ | 192–253 | 3 | 1,500 | 24 | 184 | [c] 1.1 |
| 6¼ | 165–230 | 0 | 2,200 | 50 | | |

[a] The low acid values, even with less than stoichiometric amounts of ethylene oxide resulted from polyesterification reactions.

[b] $n = \dfrac{\text{Moles ethylene oxide}}{\text{mole dimer acid}}$, as calculated from saponification values.

[c] $K_2CO_3$ catalyst was used for these experiments; $NaOCH_3$ for the others.

Table II.—*Analyses of hydroxyethylated dimer acid*

| Analysis | Hydroxyethylated dimer acid starting material numbers | | | | |
|---|---|---|---|---|---|
| | 1 | 2 | 3 | 4 | 5 |
| Acid value | 16 | 0 | 0 | 0 | 0.5 |
| Hydroxy value | 55 | 113 | 122 | 99 | 110 |
| Saponification value | 180 | 176 | 172 | 180 | 183 |
| Moles ethylene oxide/mole dimer acid | 1.1 | 1.7 | 2.1 | 1.4 | 1.1 |
| Viscosity at 25° C., poises | 90 | 132 | 112 | 79 | 36 |
| Molecular weight | 886 | | | 797 | 757 |
| Water content (Karl Fischer), wt. percent | 0.03 | | | 0.4 | 0.2 |

Table III.—*Foams prepared, "one-shot" technique*

| Formula | Foam Nos. | | |
|---|---|---|---|
| | 6 | 7 | 8 |
| Triethylenediamine (a polymerization catalyst), gm | 0.1 | 0.2 | 0.2 |
| H₂O, ml | 0.5 | 1.0 | 1.0 |
| Polyoxyethylated vegetable oil (an emulsifier), gm | 2 | 5 | 5 |
| | Mixed to a clear solution. | | |
| Then added hydroxyethylated dimer acid, sample No. (of Table II) | 2 | 3 | 4 |
| Weight, g | 17.2 | 32 | 39.3 |
| Stirred, min | 2 | | 2 |
| Then added tolylene diisocyanate, ml | 8 | 16 | 16 |
| | Stirred until foaming began (about 2 sec.). | | |

Table IV.—*Foams prepared with reversed mixing order*

| Formula | Foam Numbers | | | | |
|---|---|---|---|---|---|
| | 9 | 10–12 | 13 | 14–16 | 17–18 |
| Hydroxyethylated dimer acid, sample number (Table II) | 5 | 1 | 1 | 1 | 1 |
| Weight, gm | 16.9 | 6.9 | 6.9 | 6.9 | 6.9 |
| Tolylene diisocyanate, ml | 8 | 2.5 | 2.5 | 2.0 | 2.0 |
| Stirred min., 5,900 r.p.m. | | 0.3 | 0.25 | 0.15–0.25 | 0.2 |
| Then added a polymerization catalyst, gm | 0.05 | 0.1 | 0.12 | 0.08–0.09 | 0.1–0.12 |
| In H₂O, g | 0.25 | 0.18–0.22 | 0.27 | 0.15–0.20 | 0.18–0.21 |
| Stirred, min | | 0.15–0.20 | 0.15 | 0.15 | 0.15 |

We claim:

1. The product obtained by esterifying a polyunsaturated vegetable oil derived dimer acid mixture comprising three parts of $C_{36}$-dibasic acid and one part of $C_{54}$-tribasic acid with from 1 to not more than about 2 mole equivalents of ethylene oxide, said product having an acid number of 0–16, a saponification number of 172–183, and a viscosity at 25° C. of between 36 and 132 poises.

2. Polyester urethane foams obtained by rapidly mixing about from 35.4 to 61.0 parts by weight of tolylene diisocyanate, about from 0.3 to 1.7 parts by weight of triethylenediamine catalyst, about from 1.5 to 3.9 parts by weight of water, and 100 parts by weight of dimer acid that has been esterified with from 1 to not more than about 2 mole equivalents of ethylene oxide, said dimer acid comprising 3 parts of polyunsaturated vegetable oil derived $C_{36}$-dibasic acid and 1 part of similarly derived $C_{54}$-tribasic acid, the oxyethylenated dimer acid reactant being characterized by an acid number of 0–16, a saponification number of 172–183, and a viscosity at 25° C. of between 36 and 132 poises.

References Cited by the Examiner

UNITED STATES PATENTS 2,491,350  12/49  Young et al. ———— 260—410.6
2,758,976  8/56  Barker ———————— 252—79

FOREIGN PATENTS 1,121,801  1/62  Germany.

OTHER REFERENCES

Thierfelder et al.: American Oil Chemists' Society Journal, April 1962, pages 215–217.

LEON J. BERCOVITZ, *Primary Examiner.*

DONALD E. CZAJA, *Examiner.*

Table V.—*Polyurethane foams from hydroxyethylated dimer acids*

| Foam No. | Premix | | Mole ratio OH/NCO | Catalyts, Triethylene diamine, wt. percent of polyester | Water, Wt. percent of polyester | Physical properties | | | | |
|---|---|---|---|---|---|---|---|---|---|---|
| | Hydroxyethylated dimer acids | | | | | Area shrinkage, percent | Density, lb./ft.³ | Compression modulus, p.s.i. | Load required for 25% compression, p.s.i. | Compression set test, percent of original height |
| | Sample No. | Wt. percent | | | | | | | | |
| 6 | a 2 | 64 | 0.32 | 0.6 | 2.9 | 3 | 2.7 | 1.2 | 0.6 | 50 |
| 7 | a 3 | 82 | 0.32 | 0.6 | 3.1 | | 2.2 | 1.0 | 0.4 | 50 |
| 8 | a 4 | 67 | 0.32 | 0.5 | 2.5 | 8 | 2.3 | 0.7 | 0.15 | 50 |
| 9 | 5 | 63 | 0.33 | 0.3 | 1.5 | 16 | 4.4 | 13.4 | 3.5 | 50 |
| 10–12 | 1 | 69 | 0.20 | 1.4 | 2.9 | 0 | 2.1–2.2 | 3.1 | 1.2 | 44–45 |
| 13 | 1 | 69 | 0.20 | 1.7 | 3.9 | 0 | 2.2 | 3.1 | 1.1 | |
| 14–15 | 1 | 74 | 0.25 | 1.3 | 2.6 | 0 | 2.3–2.5 | 2.0–2.3 | 0.9 | 46–50 |
| 17–18 | 1 | 74 | 0.25 | 1.6 | 2.8 | 0 | 2.0 | | | | a One-shot procedure was used.